S. M. THORNTON.
BEET UNLOADER.
APPLICATION FILED JAN. 17, 1908.
901,852.
Patented Oct. 20, 1908.
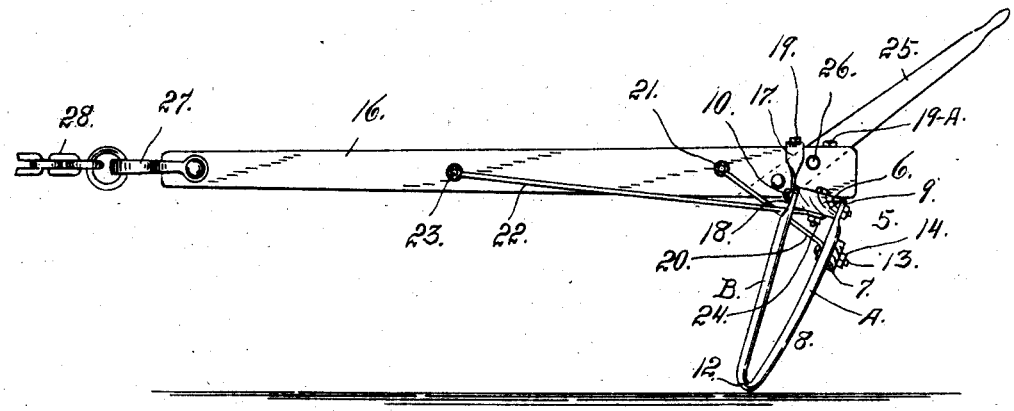
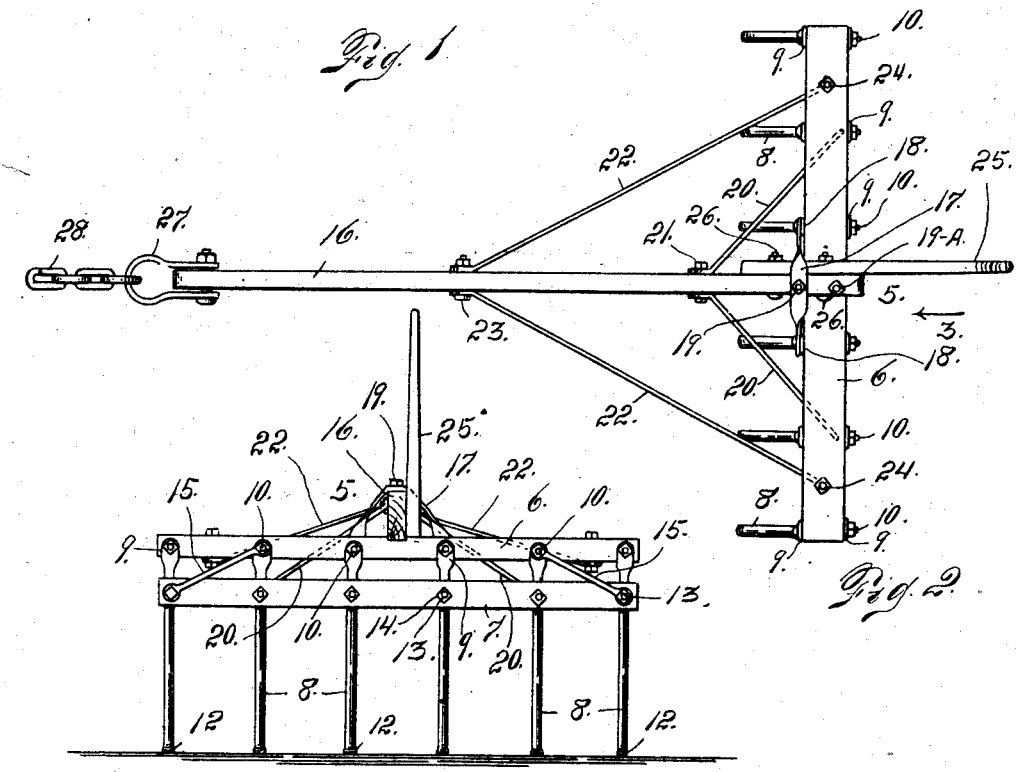

UNITED STATES PATENT OFFICE.

ANDREW O. THOMPSON, OF WOLVERTON, MINNESOTA, ASSIGNOR OF ONE-HALF TO WILLIAM C. HUFF, OF WOLVERTON, MINNESOTA.

TRAP.

No. 901,851.    Specification of Letters Patent.    Patented Oct. 20, 1908.

Application filed April 25, 1908. Serial No. 429,157.

*To all whom it may concern:*

Be it known that I, ANDREW O. THOMPSON, a citizen of the United States, and a resident of Wolverton, in the county of Wilkin and State of Minnesota, have invented certain new and useful Improvements in Traps, of which the following is a specification.

This invention is an improvement in traps and consists in certain novel constructions and combinations of parts as will be hereinafter described and claimed.

In the drawings, Figure 1 is a side view of a trap embodying my invention. Fig. 2 is an end elevation thereof, and Fig. 3 is a side view illustrating a somewhat different construction.

The trap as shown comprises the opposing jaws A and B, provided with spurs A' and B' and preferably reversely curved as shown.

The jaw A consists of two sections $A^2$ spaced apart at $A^3$ forming an intermediate slot in which the jaw B operates, and the said jaw B operates in the same plane with the jaw A, and extends within the slot $A^3$ across the circular space $A^4$ within the jaw A, as best shown in Fig. 1 of the drawing. The jaw A is arranged at one end of the base C, whose other end is upturned at C', and continued forming the arm $C^2$, as shown, and is provided with a dog D, pivoted at one end at D' to the arm $C^2$, and arranged at its other end to engage ratchet teeth $C^{10}$ on the base C. This construction is especially desirable in large or heavy traps for catching large or strong game, as it prevents the game from pushing the jaws apart and escaping after the jaws have once been sprung. The jaw A it will be noticed is in circular form, and the jaw B' extends diametrically across the same, and operates in the slot between the side sections of the jaw A, as shown in Fig. 1.

When the trap is set as shown in Fig. 1, the jaw B will be pushed away from the teeth or spurs of the jaw A, and will be held by the trigger E in the form of a bar pivoted at E', and having an upwardly projecting arm $E^2$ engaging with a pin F pivoted at one end at F', and adapted to be carried over the jaw B and across the slot $A^3$ with its free end engaged by the upwardly extended arm of the trigger, as shown in Figs. 1 and 2. This arm of the trigger may preferably be curved into hook form as shown in Figs. 1 and 2, and the body of the trigger E may be curved to conform generally to the curvature of the jaw B.

In operation when the trap is set as shown in Fig. 1, if an animal passing through the ring-shaped jaw A, treads on the trigger E it will release the trap and permit the jaws to spring toward each other thus impaling the animal and instantly killing the animal, thus making the trap humane.

The pin, teeth, or spurs A' are provided on both sections of the jaw A.

A stop block $A^5$ may be provided between the sections $A^2$ at the top of the trap to prevent the jaw B from jumping out at such point when the trap is sprung.

In Fig. 3 I show a trap which can be cheaply made of spring wire and will be found useful in making the small sizes of traps.

I claim—

1. The trap herein described, comprising a base having a ring-shaped jaw at one end composed of two sections spaced apart forming a slot between, the other end of the base being upturned and extended forming an arm, a jaw carried by said arm and curved reversely to the first said jaw, and a trigger for holding said jaws apart, the jaws being provided with opposing teeth or spurs, a dog carried by the jaw supporting arm, and ratchet teeth on the base for engagement by said dog, substantially as set forth.

2. A trap including a ring-shaped jaw composed of sections spaced apart forming an intermediate slot, and an opposing jaw operating in the said slot.

3. The combination in a trap of a base having ratchet teeth, a ring-shaped jaw on one end of the base and having sections spaced apart, an opposing jaw operating in said space between the sections of the first jaw, an arm carrying said opposing jaw, and provided with a dog engaging with the ratchet on the base, and a trigger for holding said opposing jaw, substantially as set forth.

4. The combination in a trap of a ring-shaped jaw composed of sections side by side, an opposing jaw operating between said sections and in a direction parallel to the planes thereof, and trigger devices for holding the jaw, substantially as set forth.

5. The combination in a trap of the main jaw and an opposing jaw, a pivoted trigger having a body portion and an arm project- The implement is provided with a tongue 16 whose rear extremity is secured to the top beam 6 by a metal strap 17 whose extremities are secured to the beam 6 on opposite sides of the tongue as shown at 18 by means of two of the bolts 10 employed in securing the teeth to the beam. The strap is secured to the tongue at the top by means of a vertically disposed bolt 19 and the tongue is further secured to the beam 6 by a vertical bolt 19ᴬ.

The bar 7 is connected with the tongue by brace rods 20 whose forward extremities are secured to the tongue on opposite sides thereof by a bolt 21. The rear extremities of these braces are connected with the bar by two of the bolts 13 which pass through openings formed in the rear extremities of the braces. These braces diverge from each other as they extend rearwardly from the tongue.

The top beam 6 is connected with the tongue by relatively long brace rods 22 whose forward extremities are secured to the tongue by a bolt 23 while their rear extremities engage the beam underneath and are secured thereto by vertically disposed bolts 24.

To the rear extremity of the tongue is secured a rearwardly inclined arm 25 by means of bolts 26. This arm extends rearwardly of the head 5 and is employed by an operator as a lever in forcing the teeth 8 downwardly among the beets during the operation of hauling a quantity of them from the wagon body in which they are contained.

To the forward extremity of the tongue is attached a clevis to which a chain 28 may be attached. This chain may be of any desired length, that may be necessary in order to have the team which is connected with the tongue, as far away as may be required in order to successfully operate the device.

From the foregoing description the use and operation of my improved device will be readily understood. The wagon body from which the beets are to be removed, generally has its sides hinged whereby one side may be let down for unloading purposes, are pulled or drawn so to speak downwardly among the beets thus placing a considerable quantity of the latter in front of the teeth. As the team continues to move, these beets are dragged from the wagon body. This operation may be repeated as often as necessary or until the entire load is removed.

In case it is desired to load beets upon wagons from silos or piles, the operation of course would be reversed. That is to say the wagon would be suitably located and the teeth of the device forced down among the beets of the pile or silo and they would be dragged upon the wagon body instead of from it as in unloading.

Having thus described my invention, what I claim is:

1. An unloader comprising a tongue, and a head rigidly connected with the rear extremity of the tongue, the said head being composed of teeth and two transverse beams one connected with the upper extremities of the teeth and the other connected with the teeth intermediate their extremities and in the rear thereof.

2. An unloader comprising a head and a tongue, the rear extremity of the tongue being centrally connected with the top of the head, the said head being composed of teeth, a transverse top beam and a transverse lower beam, the upper extremities of the teeth being secured to the top beam, the teeth being attached to the lower beam intermediate their extremities, the lower beam being in the rear of the teeth, and braces connecting the tongue with the upper and lower beams, substantially as described.

3. An unloader comprising a head and a tongue, the head having transverse upper and lower beams, and teeth attached to said beams, the rear extremity of the tongue being connected with the upper beam, and braces connecting the two beams with the tongue, substantially as described.

4. An unloader comprising a tongue and a head, the head being composed of a series of teeth, and transverse beams to which the teeth are attached, the rear extremity of the tongue being attached to the central part of head at a central point, and the operating arm being connected with the tongue and extending upwardly and rearwardly from the head, substantially as described.

7. An unloader comprising a head having a series of teeth, a tongue having its rear extremity rigidly connected with the top of the head, and an operating arm extending upwardly and rearwardly from the head, substantially as described.

8. An implement of the class described, comprising a frame work, a tongue centrally connected with the frame work and depending teeth, each tooth being composed of a section of pipe bent double, forming front and rear members whose upper extremities are connected with the frame at separated points, the bend of each pipe section forming the lower extremity of the tooth.

9. An implement of the class described, comprising a transverse top beam, a tongue connected with said beam at a central point, and a series of teeth extending downwardly from the beam, each tooth being composed of a section of pipe bent double to form forward and rearward members whose upper extremities are secured to opposite sides of the top beam, the bend in the pipe section forming the point of each tooth, substantially as described.

10. An implement of the class described, comprising a transverse top beam, a tongue attached to said beam, a series of teeth composed of bent pipe sections having forward and rearward members whose upper extremities are attached to the said beam, the bend of each pipe section forming the point of a tooth, and a transverse bar attached to the rear members of the teeth and located in the rear thereof, braces connecting the said beam with the tongue, and other braces connecting the said bar with the tongue, substantially as described.

In testimony whereof I affix my signature in presence of two witnesses.

STUART M. THORNTON.

Witnesses:
 DENA NELSON,
 JESSIE HOBART.